Feb. 24, 1948.  B. B. WESTMORELAND  2,436,736
COLLAPSIBLE CANOPY TOP FRAME
Filed July 12, 1945  2 Sheets-Sheet 1
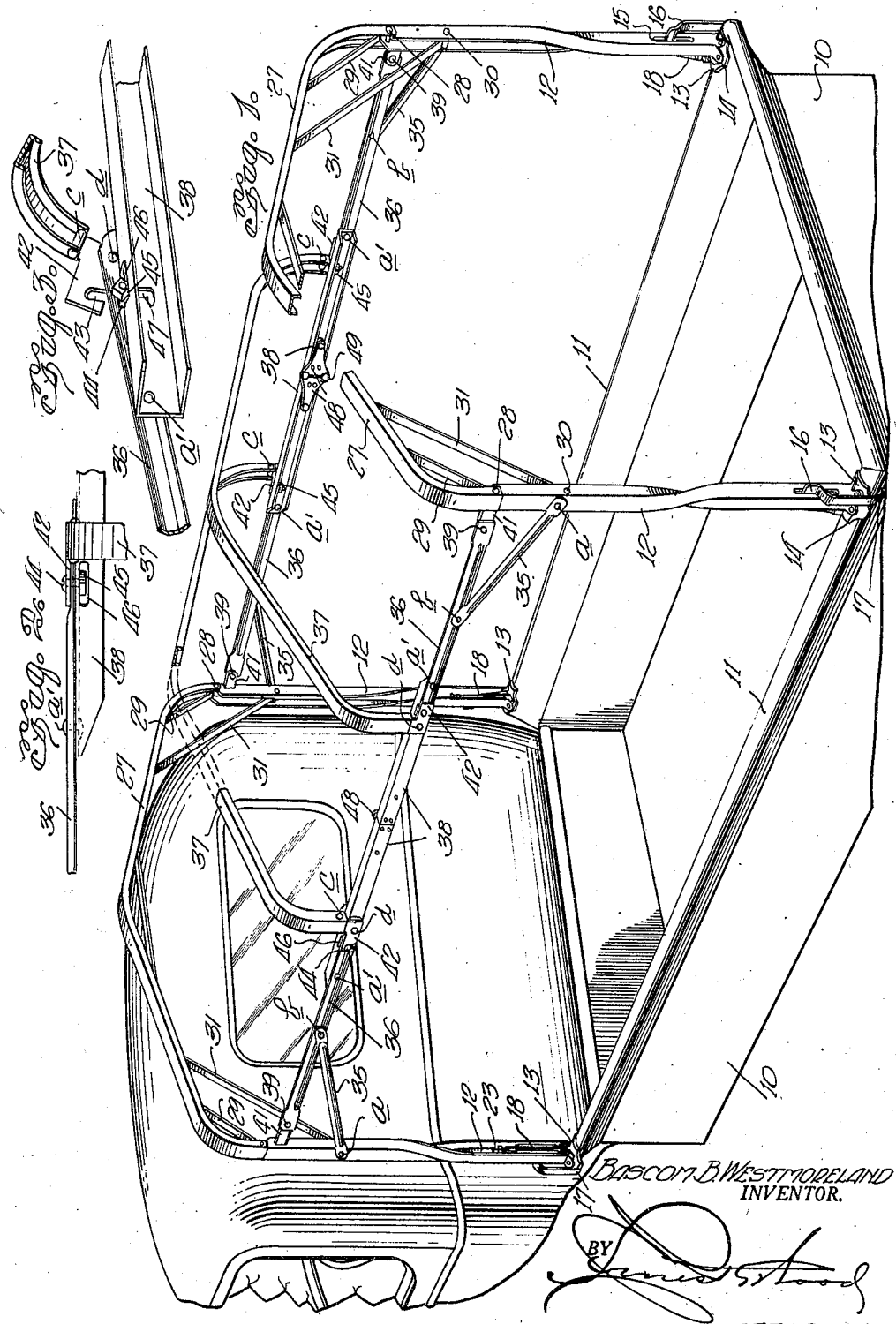
Bascom B. Westmoreland
INVENTOR.
BY
ATTORNEY Feb. 24, 1948.  B. B. WESTMORELAND  2,436,736
COLLAPSIBLE CANOPY TOP FRAME
Filed July 12, 1945  2 Sheets-Sheet 2
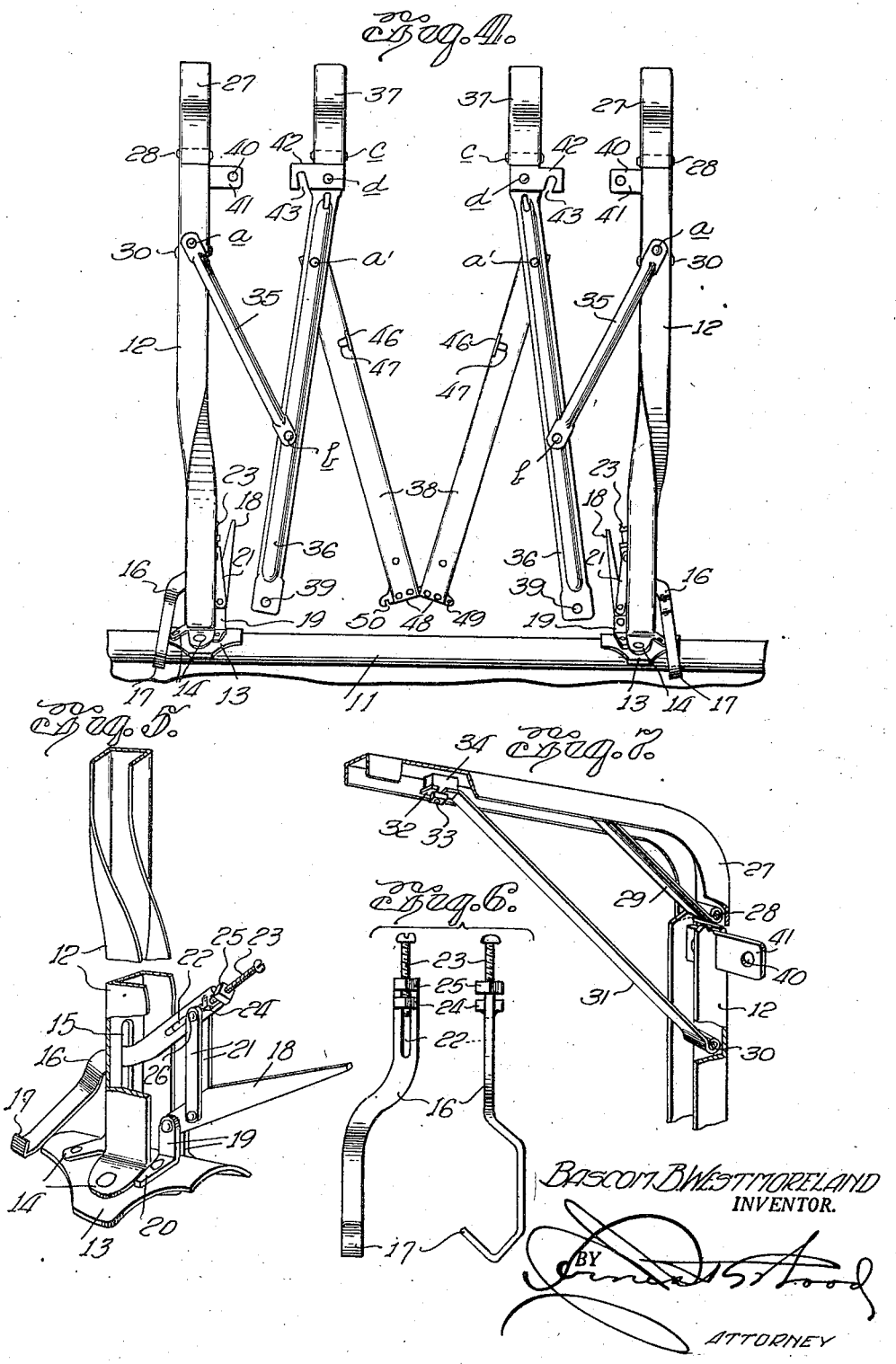
Bascom B. Westmoreland
INVENTOR.
ATTORNEY Patented Feb. 24, 1948

2,436,736

UNITED STATES PATENT OFFICE 2,436,736

COLLAPSIBLE CANOPY TOP FRAME

Bascom B. Westmoreland, Grand Prairie, Tex., assignor to Ben G. Barnett, Dallas, Tex.

Application July 12, 1945, Serial No. 604,666

5 Claims. (Cl. 296—105)

This invention relates to collapsible canopy frames for vehicles and it has particular reference to such frames adapted for use on pick-up trucks, drays and the like.

The principal object of the invention is to provide a light but durable frame, composed of a minimum of parts, which can be quickly and easily folded into a small and compact unit for convenient packing and shipping. The invention can as readily be unfolded and mounted on a truck body as a frame support for a weatherproof covering of fabric or other material, with but a minimum amount of effort.

Another object of the invention resides in the provision of a novel form of clamp for each of four uprights or supports, by which the frame is firmly secured to the sides of a vehicle bed.

With the foregoing objects as paramount, the invention has further reference to certain features of accomplishment which will become apparent as the description proceeds, taken in connection with the accompanying drawings wherein:

Figure 1 is a perspective view of a canopy frame constructed according to the invention, shown mounted on a truck bed.

Figure 2 is a detail plan view showing the pivotal and locking connection between two elements of one of the horizontal braces of the frame.

Figure 3 is a perspective view of the structure shown in Figure 2 but showing the elements pivotally displaced.

Figure 4 is a side elevational view of the complete frame in partially folded position.

Figure 5 is a perspective view of one of the clamps, showing the upright fragmentarily and partly broken away.

Figure 6 is a collective view showing front and side views respectively of a part of the frame clamp, and Figure 7 is a fragmentary perspective view of one of the uprights and a part of a bow, showing the relative hinging and bracing means therefor.

Continuing with a more detailed description of the drawings, reference is primarily made to Figure 1 wherein numeral 10 denotes the bed of a conventional pick-up truck or other vehicle on which the invention, to be presently described, may be arranged as a cover supporting frame. Usually, the bodies or specifically the beds 10 are provided with flaring sides whose upper edges 11 are rolled, as shown.

The invention consists of four legs or uprights 12 constructed from channel iron or other metal formed into channels and to properly orient these uprights, each is twisted intermediate its ends whereby the upper portions of the end uprights will be relatively confronting while the lower portions of the side uprights will confront each other. In forming these uprights of channels, they will be of greater strength and yet will be comparatively light in weight which is a desideratum in view of the fact that the chief purpose of designing the invention as hereindescribed, is to bring it under weight and dimension requirements of ordinary parcel post.

The lower ends of the uprights 12 are each equipped with a clamp consisting of a saddle 13 to which the uprights are riveted, bolted, welded or otherwise secured. In the present case, the uprights are shaped at their lower ends to define ears 14 which are riveted or welded to the saddle 13. A slot 15 is made in the web of the upright channel adjacent its lower end and through this slot extends the upper portion of a hook member 16, whose lower portion is curved outwardly from the base of the upright, thence downwardly and upwardly into a hook 17 which is formed to engage under the rolled edges 11 of the bed 10.

To effectively raise the member 16 to bring the hook 17 into engagement with the underside of the roll 11, a lever 18 is provided and is pivoted between parallel ears 19 at one end. The ears are secured by welding or riveting turned out portions 20 (Fig. 5) to the saddle 13. By means of a pair of parallel links 21, the lever 18 is connected intermediate its ends to a longitudinal slot 22 at the upper end of the hook member 16. It is apparent that even without the slot 22, raising and lowering of the lever 18 will respectively raise and lower the hook member 16 but to provide for variation in the degree of movement of the latter member, the slot is provided and a screw 23 is threaded longitudinally thereinto through an internally threaded boss 24. A lock nut 25 secures the screw against accidental displacement from adjusted positions. It is apparent that by moving the screw downwardly, upward movement of the links 21 is restricted by the pin 26, sliding in the slot 22 and engaging the lower end of the screw 23. This accordingly limits the degree of upward movement of the hook 17. By raising the screw 23, upward movement of the hook is extended. Obviously, this arrangement will adapt the mounting to beds whose side rolls vary in cross-sectional dimensions.

Each of the uprights 12 has, pivoted to its upper end an end of a bow 27 which extends from one side of the bed to the other at the ends thereof. Figure 7 reveals the manner in which the bows are fastened to the uprights. A pin 28 is passed through the channels of the bow and upright and is embraced by a rolled end of a strap 29 which extends diagonally upward and is affixed to the web of the bow between the flanges thereof to reinforce the curve therein. Spaced below the upper end of the upright 12 and its pivotal connection with the bow 27 is a pin 30, to which is secured the lower end of a longer brace 31 which extends parallel with brace 29 but instead of being fixed to the underside of the bow 27, it is releasable by virtue of the slotted end 32 (Fig. 7) engaging a bolt 33, mounted in a block 34 in the bow between the flanges.

Connected pivotally at $a$ to each upright 12, just above the pin 30 is an arm 35, whose upper end is pivoted at $b$ to the end section 36 of one of two horizontal and sectional side frames, supporting intermediate bows 37.

The side frames are made up of the end sections 36 above mentioned and intermediate sections 38, the latter being preferably formed from channel iron while the former is of beaded material for rigidity.

Regarding the invention from the partially folded position shown in Figure 4, it will be observed that in order to assemble the parts in their proper relationship, the uprights 12 are moved apart so that the end uprights will be stationed at the ends of the truck bed. This action causes the members 35, 36 and 38 to assume their proper positions as shown in Figure 1 or nearly so, by reason of their pivotal connections at $a'$, whereupon the pin or projection 39, carried by the free end of each of the end sections 36 is thrust manually into its respective aperture 40 in a plate 41, anchored in the upper end of each of the uprights 12, as shown particularly in Figure 7. The tendency of the members 36 and 38 to lie in axial alignment will be effective to hold the pins 39 in the apertures 40.

As a further means of securement to hold the said frame sections in alignment, each of the intermediate bows 37 are provided with plates 42, which are hinged at $c$ to the ends of said bows. (Fig. 3). These plates have slots 43 therein and are pivoted at $d$ to the inner ends of the end sections 36 of the horizontal frame members. Adjacent the pivotal point $d$ of the plates 42, a bolt 44 extends through the end section 36 and has a nut 45 threaded thereon. As the members 36 and 38 are moved into axial alignment, the nut 45 passes through an opening 46 in the flange of the section 38, communicating with a slot 47 in the web of this member into which the bolt 44 moves, after which, the nut is tightened to secure the members 36 and 38 in extended position. Before tightening the nut however, the plate 42 is moved on its pivot so that the slot therein will engage the bolt 44. When the nut is tightened, all of the elements including the bow 37 will be secured in operative position.

When the foregoing assembling operation has been completed, the relatively hinged ends of the intermediate sections 38, which will have been moved into axial alignment, are secured. The securing means consists of relatively pivoted lock hinges 48, affixed to the contiguous ends of the said sections 38, one of which carries a pin 49 (Fig. 4) which is received in a slot 50 in the companion hinge. A nut is threaded onto the pin and when tightened, the members 38 are securely held in axial alignment.

It will be understood that the foregoing operation is duplicated to secure the elements making up both of the horizontal frames disposed on each side of the assembly.

When the frame is to be folded for storage or shipment, the nuts securing the hinges 48 are loosened, as are the nuts 45 fastening the ends of end sections 36 to intermediate sections 38. The ends of sections 36 are released from their respective extension plates 41, whereupon the elements resume the positions shown in Figure 4, but are moved into more compact relationship. It is then possible to move the uprights 12 into parallelism with the bows 27 and the end sections 36 as well as the intermediate sections 38 into parallelism with their respective bows 37. Before folding the uprights into parallel relation to the bows 27 however, the bifurcated ends 32 of the angular braces 31 are detached from the bolts 33 so that the braces will drop into the channels of the uprights.

When the canopy frame is folded as described, the overall measurement of the folded body will be the length of the bows and the distance between the apex of the bows and their turned ends, all of the other elements being disposed within these dimensions. Accordingly, the folded frame will present a comparatively small bulk when packaged for shipment.

Manifestly, the construction as shown and described is capable of some modification and such modification as may be construed to fall within the scope and meaning of the appended claims is also considered to be within the spirit and intent of the invention.

What is claimed is:

1. A folding canopy frame comprising front and rear pairs of uprights, arched bows having their ends connected to the upper ends of respective uprights by transverse pins, horizontal frames connecting said pairs of uprights adjacent their tops each consisting of relatively pivoted end and intermediate sections, axially aligned, the outer ends of said end sections being detachably connected to said uprights adjacent their upper ends, angular braces forming pivotal connection between said end sections and uprights, intermediate bows each supported at each end by an end section of said horizontal frames by pivots in right angular relationship for relative oscillative displacement and for foldability into relative parallelism, means for securing said sections in rigid, axially aligned relationship and means for anchoring the lower ends of said uprights.

2. A foldable frame for a vehicle canopy comprising corner uprights, transversely arranged bows having their ends transversely hinged to the upper ends of respective uprights for foldability into relative parallelism, horizontal side frames extending between said uprights, each comprising end sections releasably connected to said uprights at one end and intermediate sections hinged at their contiguous ends and pivoted at their opposite ends to said end sections, intermediate bows whose ends are attached to the inner ends of said end sections by pivots at relative right angles for oscillative displacement and foldability of said bows and end sections, and means for securing said sections and bows in rigid axially aligned relationship.

3. A collapsible canopy frame for vehicles including front and rear uprights, front and rear canopy supporting bows having their ends hinged at right angles to their longitudinal axes to the upper ends of the front and rear uprights respectively for foldability into relative parallelism, horizontal side frames, each comprising end sections releasably connected at one end to the upper end of respective uprights and relatively hinged intermediate sections having pivotal connection at their opposite ends with said end sections intermediate the ends of the latter, angular braces pivotally connecting said end sections intermediate their ends to said uprights below the tops of the latter, intermediate bows supported by said end sections on pivots transverse to their longitudinal axes and by adjacent pivots at right angles to said first pivots for foldability into relative parallelism and means for rigidly securing said sections in axial alignment.

4. A collapsible canopy frame including two pairs of supporting uprights, bows having their ends hinged to the upper ends of respective pairs of uprights for foldability into relative parallelism, horizontal frames on each side of said canopy frame, each comprising end sections and axially aligned intermediate sections hinged at their contiguous ends and at their opposite ends to points intermediate the ends of said end sections, means for releasably connecting the opposite ends of the latter sections with said uprights adjacent their upper ends, angular braces extending between said uprights and end sections and pivotally connected thereto, means for releasably securing said sections in axial alignment, intermediate bows to which the inner ends of said end sections are attached for pivotal displacement in a vertical plane and for foldability into parallelism with said bows, and means for anchoring the lower ends of said uprights.

5. A folding canopy frame comprising spaced apart pairs of uprights, a transverse bow at each end of said frame, said bows having their ends hinged to each pair of uprights transverse to their major axes for foldability into parallelism with said uprights, horizontal frames extending from one to the other of said pairs of uprights and comprised of relatively pivoted end and intermediate sections, intermediate bows whose ends are connected to the inner ends of said end sections for foldability into perpendicular relationship with said uprights in operative position and means for anchoring the lower ends of said uprights.

BASCOM B. WESTMORELAND.

REFERENCES CITED

The following references are of record in the file of this patent:

UNITED STATES PATENTS

| Number | Name | Date |
|---|---|---|
| 26,547 | Dikeman | Dec. 20, 1859 |
| 2,262,129 | Andrews et al. | Nov. 11, 1941 |

FOREIGN PATENTS

| Number | Country | Date |
|---|---|---|
| 13,086 | Great Britain | July 4, 1893 |
| 431,285 | Great Britain | July 4, 1935 |